United States Patent [19]

Lancto et al.

[11] 4,123,747
[45] Oct. 31, 1978

[54] IDENTITY VERIFICATION METHOD AND APPARATUS

[75] Inventors: Donald C. Lancto, Red Hook; Robert E. Shuck, West Hurley, both of N.Y.

[73] Assignee: International Business Machines Corporation, Armonk, N.Y.

[21] Appl. No.: 799,050

[22] Filed: May 20, 1977

[51] Int. Cl.² ............... G06K 7/08; G06F 7/06; H04Q 9/00
[52] U.S. Cl. ................... 340/149 A; 235/380
[58] Field of Search ............... 340/149 A, 149 R; 235/61.7 B

[56] References Cited

U.S. PATENT DOCUMENTS

| | | | |
|---|---|---|---|
| 3,956,615 | 5/1976 | Anderson et al. | 340/149 A |
| 3,985,998 | 10/1976 | Crafton | 340/149 A |
| 3,996,450 | 12/1976 | Kerkhoff | 340/149 A |
| 4,016,405 | 4/1977 | McCune et al. | 235/61.7 B |
| 4,023,013 | 5/1977 | Kinker | 235/61.7 B |

*Primary Examiner*—Donald J. Yusko
*Attorney, Agent, or Firm*—Karl O. Hesse

[57] ABSTRACT

An improved method for verifying the identity of a prospective terminal user presenting an identification card or a credit card and a memorized personal identification number. Only part of the information necessary to correlate an account number to a personal identification number is available at any accessible place in the operating system. Neither the credit card, the host computer, nor the transmission link will ever have sufficient information to completely correlate an account number to a personal identification number.

6 Claims, 15 Drawing Figures

SEQUENCE BUS FIELDS

| | SEQUENCE MODE | | SEQUENCE COUNT | | | | | | | | SEQUENCE MODIFIERS | | | |
|---|---|---|---|---|---|---|---|---|---|---|---|---|---|---|
| | | | | | | | | | | | OVER FLOW | OFF LINE | OTHER | OTHER |
| TEST | 0 | 0 | X | X | X | X | X | X | X | X | | | | |
| ISSUE | 0 | 1 | X | X | X | X | X | X | X | X | | | | |
| USE | 1 | 0 | X | X | X | X | X | X | X | X | X | X | X | X |
| OTHER | 1 | 1 | X | X | X | X | X | X | X | X | X | X | X | X |

| DATA TYPE | ADDRESS BIT PATTERN | | | | | | |
|---|---|---|---|---|---|---|---|
| | MSB | 64 | 32 | 16 | 8 | 4 | 2 LSB |
| HOST BUFFER | 0 | X | X | X | X | X | X X |
| CARD BUFFER | 1 | 0 | 0 | 0 | 0 | 0 | X X |
| ID DW | 1 | 1 | 1 | 0 | 1 | X | X X |
| ID KW | 1 | 1 | 1 | 1 | 0 | X | X X |
| COMM KW | 1 | 1 | 1 | 1 | 1 | X | X X |

MEMORY CONTENT AT END OF SEQ STATE S4

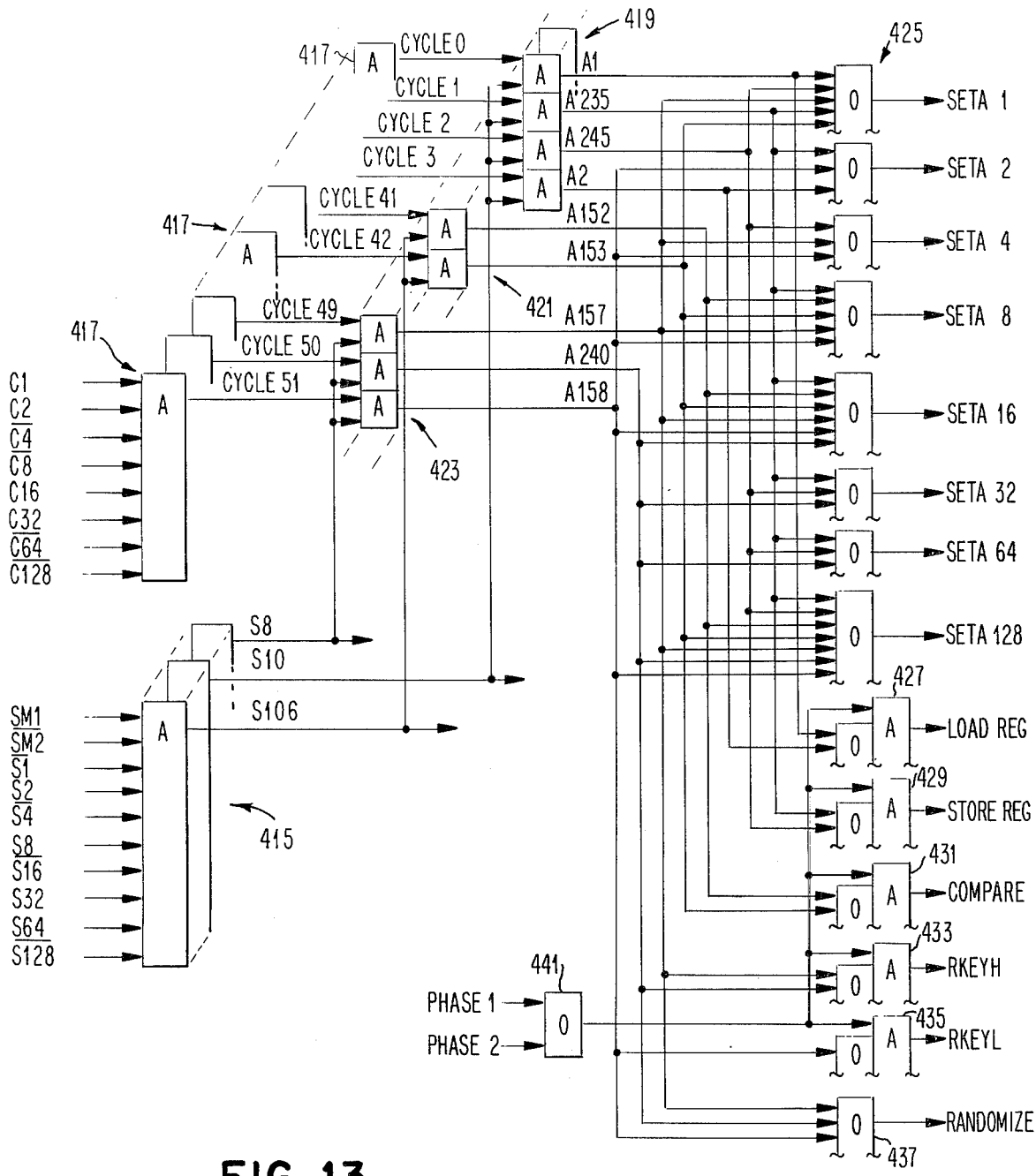
FIG. 13
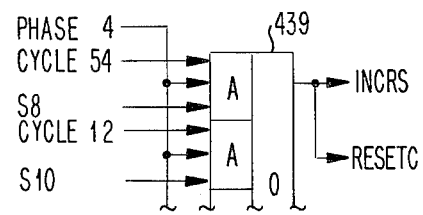

IDENTITY VERIFICATION METHOD AND APPARATUS

BACKGROUND OF THE INVENTION

In the human-to-computer interactive terminal environment, it is often desirable to ascertain, with some measure of accuracy, that a customer using a remote terminal is actually who he represents himself to be. Identification cards and credit cards have been used for this purpose for some time; however, theft of the identification card makes this metod of identification verification inaccurate. In order to verify the identity of a person presenting an identification card, many exotic techniques including fingerprint, voice print, signature, facial feature, and even human body acoustic transfer function analysis have been suggested.

A most popular method involves requiring that a prospective identification card user provide a memorized personal identification number (PIN) in addition to the identification card as proof of identity. If the PIN is to be verified in the terminal, the PIN may be algorithmically related to another number such as a bank account number or driver's license number stored on a magnetic stripe on the identification card. Or, the PIN may be encrypted in some manner and stored on the magnetic stripe on each card. If sufficient storage is available in the terminal, a table may be provided so that the PIN may be mathematically unrelated to the number on the identification card thereby making determination of the PIN from the card impossible. When the terminal has inadequate memory size to contain a table having an entry for every account number, for example, such as at a cash dispensing terminal, and if the PIN is not encrypted on the card, it will be necessary to transmit the account number from the card and the PIN entered by the customer to a host computer for verification. To defeat attempts to learn the PIN associated with an account number by monitoring the communication line or by gaining access to the verification process in the host computer, various encryption schemes have been suggested.

For example, a cash issuing terminal may have logic hardware or a microprogram to operate as defined by the following steps:

1. A customer wishing to use the terminal inserts his credit card having magnetically encoded account number and other identifying information in accordance with the American Bankers Association (ABA) standard. The customer then enters the personal identification number (PIN) and other transaction information such as the amount of cash requested through the keyboard.

2. The terminal logic encrypts the account number using a first encryption key A and an algorithm such as the National Bureau of Standards (NBS) algorithm to obtain a result which is compared with the PIN. The NBS Data Encryption Standard algorithm was published Friday, Aug. 1, 1975 at page 32395 of the Federal Register Vol. 40, No. 149. Absence of a predetermined correspondence results in the card being selectively returned to the customer or retained in the terminal.

3. If correspondence is found, the PIN is encrypted using a bank encryption key B, which may be the same as the first encryption key A. The encrypted PIN is combined with time variable information such as a sequential transaction number or cash counters in the terminal to prevent repetitive transmission of identical information fields, and is then encrypted again using transmission key C, and is transmitted (considered to be double encryption) as a message to a host computer.

4. Upon receipt of the message at the host computer, customer written application programs cause the message to be decrypted using the transmission key C and the encrypted PIN is compared with the encrypted PIN stored in the host computer data base for the account number against which the transaction is to be processed. Credit limits, and other account status information may be checked as well.

5. If the encrypted PIN compares with the encrypted PIN stored for the account against which the transaction is to be processed, and the status of the account is in order, a reply message including time variable data such as the cash count received from the terminal, and transaction authorization, display messages, etc., are all encrypted with the transmission key C and sent to the cash issuing terminal.

6. Upon receipt at the cash issuing terminal, the reply message is decrypted using the transmission key C and the time variable data is compared with the time variable data field of the inquiry message to insure against error. If the message is correct, the terminal executes the commanded action such as issue cash or display a message.

7. The terminal then generates a status message to inform the host computer of the execution or cancellation of the transaction and of any error conditions at the terminal.

The example prior art method of operation described above uses two levels of encryption and time varying message data content to hide the PIN and account number from persons monitoring the communication link and one level of encryption to hide the PIN for each account number in the host data base.

In the interchange environment, when the cash issuing terminal may be of a different manufacture and operated by a different bank, the card issuing bank will have to share knowledge of the transmission key C with the operating bank in order to allow the computers of these different banks to communicate. The PIN will then be protected by only one level of encryption and may not be protected by time varying message data content during transmission. The PIN may not be protected at all at the host computer after decryption using the shared transmission key C unless the bank key B is also shared so that the PIN can be transmitted in double encrypted form. Furthermore, if the bank key B is ever compromised, the entire data base of account number/PIN relationships will be available to the unscrupulous at the host computer data base and may be collected by tabular attack from the transmission link.

All known prior art has full Account No./PIN relationship information either on the card, or in the computer. U.S. Pat. Nos. 3,662,342 and 3,655,162 teach a changing key and scrambled or encrypted information on the card for comparison with a PIN but both require that all information necessary for correlation of account number and PIN be recorded on the card where it is vulnerable.

U.S. Pat. No. 3,697,729 uses random pattern of spots also on the card.

U.S. Pat. Nos. 3,543,904, 3,401,830, and other patents show various encrypting schemes for hiding the account number/PIN relationship stored on the card.

U.S. Pat. No. 3,648,020 teaches transmitting the PIN to the central data base for comparison.

SUMMARY OF THE INVENTION

The improved method for verifying the identity of a prospective terminal user presenting an identification card or a credit card and characteristic information such as a memorized personal identification number derives its advantage over the prior art from the fact that only a portion of the information necessary to correlate an account number to a personal identification number is available at any accessible place in the terminal operating system. Other types of characteristic information may for example be a digitized fingerprint, voice print, height/weight/hair color, or any other information related to the prospective user. Neither the credit card, the transmission link, nor the host computer will have sufficient information to allow a person who has obtained access to one of these portions of the operating system to completely correlate an account number to the characteristic information. In one preferred embodiment of the invention, a portion of an encrypted personal identification number is recorded on the corresponding identification card and another portion of the encrypted personal identification number is recorded in the host computer. Thus if an unscrupulous person were to obtain access to either the credit card or the host computer data base, only a portion of the correlating relationship between an account number and the related personal identification number would be exposed. An additional security feature of the invention is the use of a changeable personal encryption key. Use of this personal key obviates the need for a bank encryption key B.

Accordingly it is an object of this invention to substantially improve the security in an interactive terminal operating system.

It is a further object of this invention to provide a personal identity verification method wherein only part of the information necessary to correlate an account number to characteristic information is available at any one accessible place within the terminal system.

It is a still further object of this invention to provide for recording of a personal and encryption key on the identification card whereby the exposure presented by unauthorized access of an unscrupulous person to the host data base is still further reduced.

BRIEF DESCRIPTION OF THE DRAWINGS

FIG. 13 shows example details of decode 405 of FIG. 12.

PREFERRED EMBODIMENT OF THE INVENTION

Figure 1:
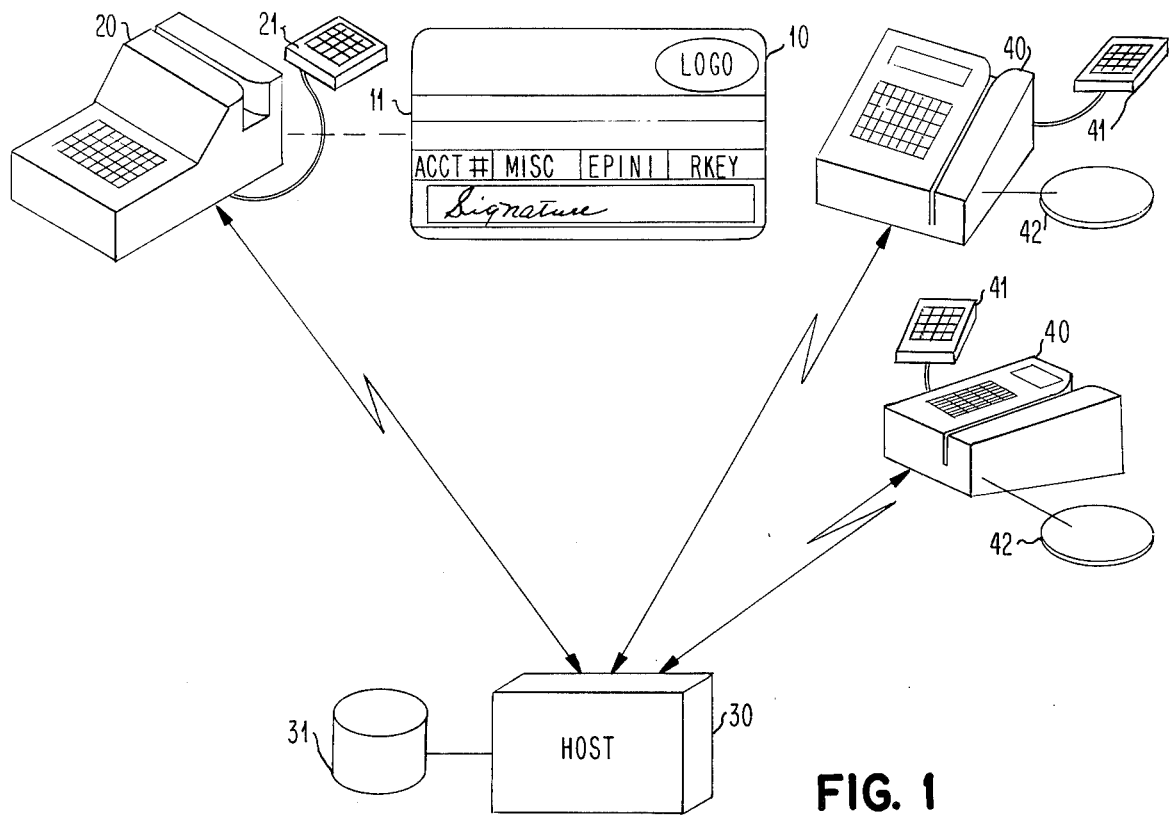
FIG. 1 shows a block diagram of a terminal system wherein the invention finds utility including an identification card 10 in accordance with the invention.

FIG. 1 gives the outline of a terminal system including an identification card 10 carrying only a portion of the correlating relationship between the identification number and the personal identification number in accordance with the invention. An administrative terminal 20 is shown in the upper left. The administrative terminal 20 is primarily used by an employee of the card issuing institution to initialize the account number/personal identification number correlating relationship, a portion or partial result of which is recorded on the card 10 as EPIN1, and another portion or second partial result of which is recorded at the host computer 30 data base as EPIN2. EPIN1 and EPIN2 of course refer to the first portion of the encrypted PIN and the second portion of the encrypted PIN respectively. Terminal 20 and enquiry terminals 40 are connected to computer 30 by standard communication links which may be switched or leased lines.

The identification card 10 has three magnetic recording tracks in this preferred embodiment. The first two tracks 11 and 12 may for example conform to the International Airline Transport Association and American Bankers Association standards. The third track 13 is a read/write track created by terminal 20 and which can be updated by a terminal 40 during each transaction. The third track 13 when created by terminal 20, may for example, contain an account number, account balance information and card usage information helpful in executing a limited transaction without support of the data base at the computer of the bank or card issuing institution. Such limited transactions will be logged to a local diskette or tape 42. In addition, in order to implement the invention, in this preferred embodiment, the third track 13 contains the previously described partial result EPIN1 field and in order to further increase security, an RKEY field. RKEY is a changeable random number key which is utilized by the encryption algorithm of terminals 20 or 40 in order to encrypt the memorized personal identification number (PIN). It is significant to note that the algorithm used by terminals 20 and 40 may be a truly irreversible algorithm in that during normal operation of the terminal system, only encryption of the PIN is required. There is never any time during normal operation of the terminal system that decryption of EPIN1 and/or EPIN2 is required. In theory, the use of a truly irreversible algorithm makes it impossible to obtain the PIN even if the account number, the encryption key and the entire encrypted PIN were all simultaneously available. It is however a principle of the invention that only part of the encrypted PIN is ever available at any accessible place in the operating system and therefore even though a truly irreversible algorithm may not be available, security is not compromised.

Figure 2:
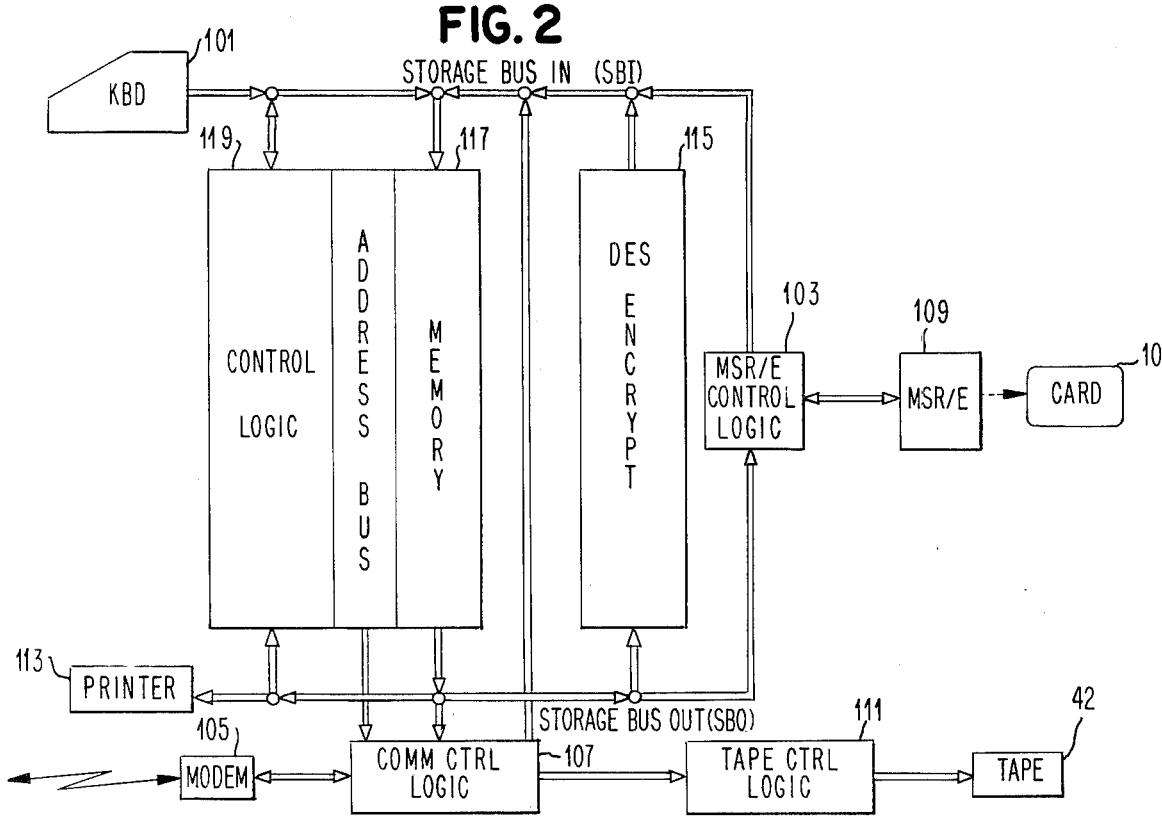
FIG. 2 depicts in block diagram form, a terminal suitable for preparing and using identification cards according to the invention in the system of FIG. 1.

Referring now to FIG. 2, a block diagram of the internal logic of terminals 20 and 40 is shown. Terminals 20 and 40 each include a keyboard (KBD) 101, a magnetic stripe reader encoder (MSR/E) 109, and a communication interface including modem 105 and communication control logic 107. The interface between modem 105 and communication control logic 107 preferrably complies with the RS 232 standard. In addition to the recited input/output units, each terminal may optionally include a diskette or tape storage device 42 and its associated control logic 111 for logging pertinent data of limited transactions executed while the terminal is off line from the host computer. Also, in addition, each terminal may contain an optional printer 113 for printing out complex messages from the host computer and also providing hard copy records of the transactions such as receipts, bills of sale, etc. In addition to the above recited input/output units, a data encryption standard encrypting means 115 is provided for encrypting the personal identification number (PIN) in order to generate EPIN1 and EPIN2.

A data interface between each of the aforementioned units of each terminal is provided by memory 117 which includes a storage bus in (SBI) and a storage bus out (SBO). Likewise in order to provide a control interface between each of the aforementioned units including the memory, a control logic unit 119 is provided to control the operation of the machine. Control logic unit 119 is in a low cost unit, preferably embodied in hardware such as one or more programmable logic arrays in order to avoid the accessibility and programming bugs often associated with programmed interactive terminals. In particular, the use of hardware makes it more difficult for an unscrupulous person to change the operation of the terminal so as to effect a compromise of the security system. It should be recognized however, that so long as minimal security provisions are provided to inhibit tampering with the operation of the terminal by changing the program, terminals 20 and 40 may be embodied using a microprocessor such as, for example, an ITEL 8080 and a program to control each of the aforementioned input/output units and memory 117. In the event that the control logic unit 119 is embodied in the form of a programmed microprocessor, the data encryption standard encrypt unit 115 may also take the form of a program subroutine to be executed on the same microprocessor.

Figure 3:
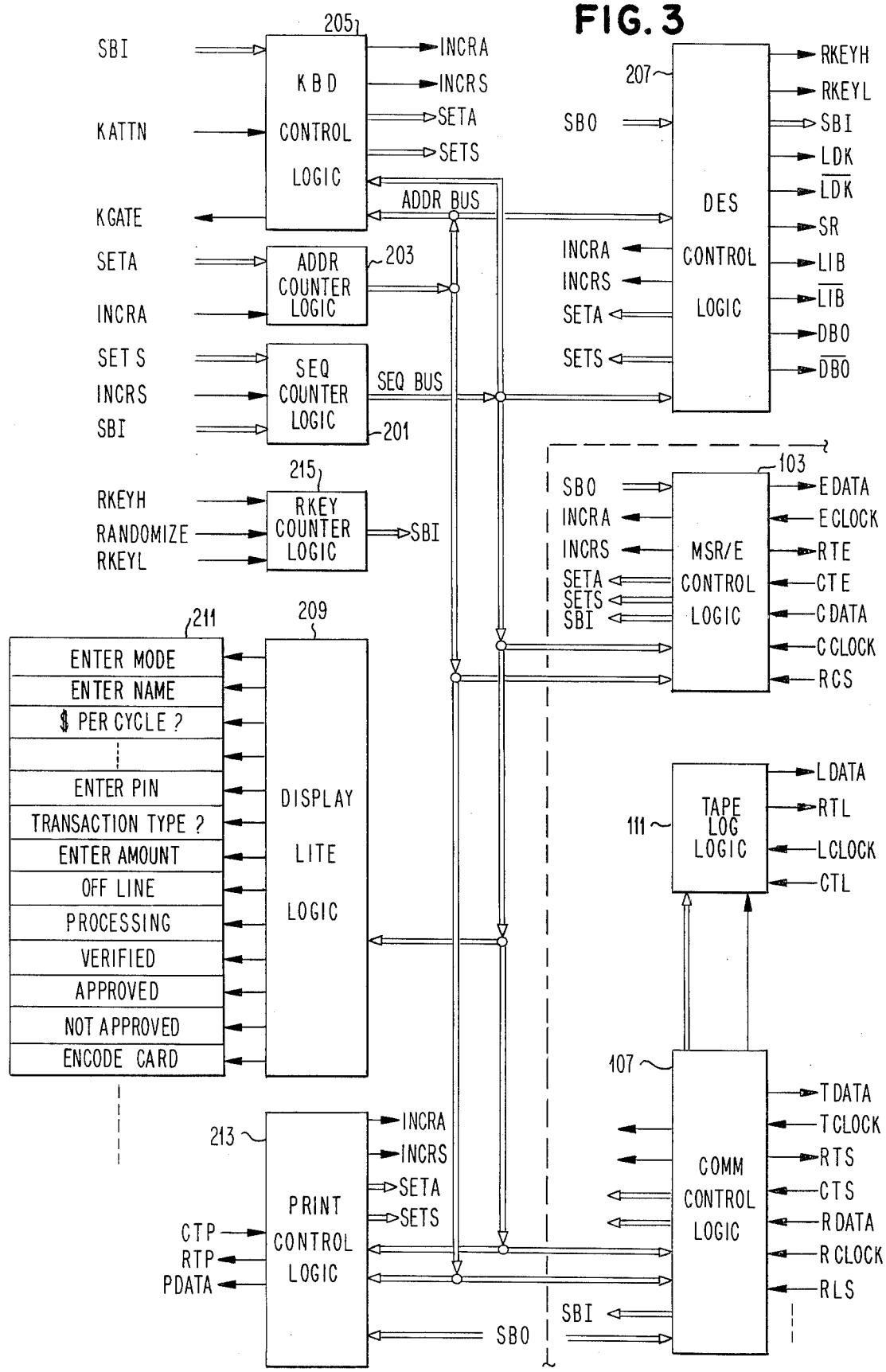
FIG. 3 depicts in greater detail, the control logic 103, 107, 111, and 119.
Figures 6, 7, 8:
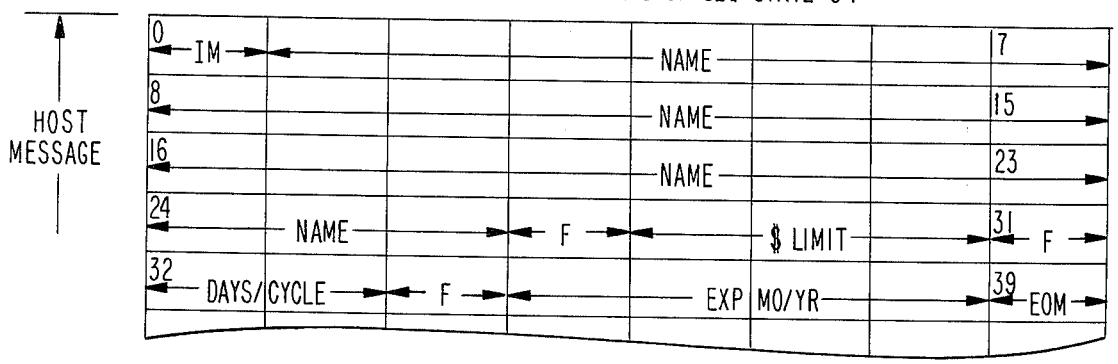
FIG. 6 is a table depicting the sequence bus bit pattern and the meaning thereof.
FIG. 7 is a table showing the relationship of data type stored to address bit pattern.
FIG. 8 is a diagram of the content of memory 117 at the end of sequence state S4.

Referring now to FIG. 3, a more detailed block diagram showing the logical units within control logic 119 and input/output lines to communication control 107, tape control 111 and MSR/E control 103 is set forth. The heart of control unit 119 is sequence counter 201. The bit pattern of sequence counter 201 at all times identifies the operating state of the terminal. The output of sequence counter 201 is applied to the sequence bus for distribution to each of the I/O control logic units. As shown in FIG. 6, the output provided by sequence counter 201 to the sequence bus includes three fields.

The first, or sequence mode field, identifies and controls the operation mode of the terminal. That is, the terminal may be operated in a test mode for error diagnostic or preventative maintenance purposes. The terminal may also be operated in an issue mode so that an emloyee of a card issuing institution may issue an identification card to a customer. Most probably, the terminal will be operated in the use sequence mode, whereby a customer who presents an identification card is allowed to use the terminal in accordance with the security system of the invention. Other modes may also be provided as desired.

The sequence of operations or steps executed by the terminal while operating in any one of the modes defined by the first field is controlled by the sequence count of the second field. The sequence count of the second field is a simple binary counter which may be incremented by the input signal labeled INCRS to the next sequential binary number or the sequence counter may be set to any binary number in much the same fashion that a register is loaded. Allowing the sequence counter to be set allows operating steps of the terminal to jump back and forth as necessary to accomodate unexpected conditions such as incorrect input or other out of the ordinary operations.

The third field of the sequence bus includes sequence modifier lines which modify the sequence state identified by the mode and count fields to indicate such conditions as field overflow, off line status, invalid personal identification number, not approved credit status or any other special condition. Primarily the sequence modifier bits are set by input/output control logic such as the keyboard control logic 205 or the communication control logic 107 which monitors message information from the keyboard, or from the host computer, and decodes selected bytes of this message information to modify the sequence state of the terminal. In the overflow condition, for example, if an alphanumeric character is detected when a field separator character is expected, the keyboard control logic 205 activates the overflow signal line of the SETS input lines to set the overflow sequence modifier latch in sequence counter 201. In another example, if a message byte is not received from the host computer after a predetermined period of time such as during which six poll messages would normally have been expected, a time out counter provides a signal on the off line wire of the SETS lines to set the off line sequence latch in sequence counter logic 201.

In much the same manner as sequence counter logic 201 controls the operating state or sequential steps which control the functional operation of the terminal, address counter logic 203 controls the address of memory of 117 and thereby controls the data flow within the terminal. The address bit pattern provided at the output of address counter logic 203 is shown in FIG. 7. The inputs to address counter logic 203 include an increment signal line sequential address location and the input bus labeled SETA to set the address counter to any predetermined value thereby accomplishing a jump or branch operation.

Figure 9:
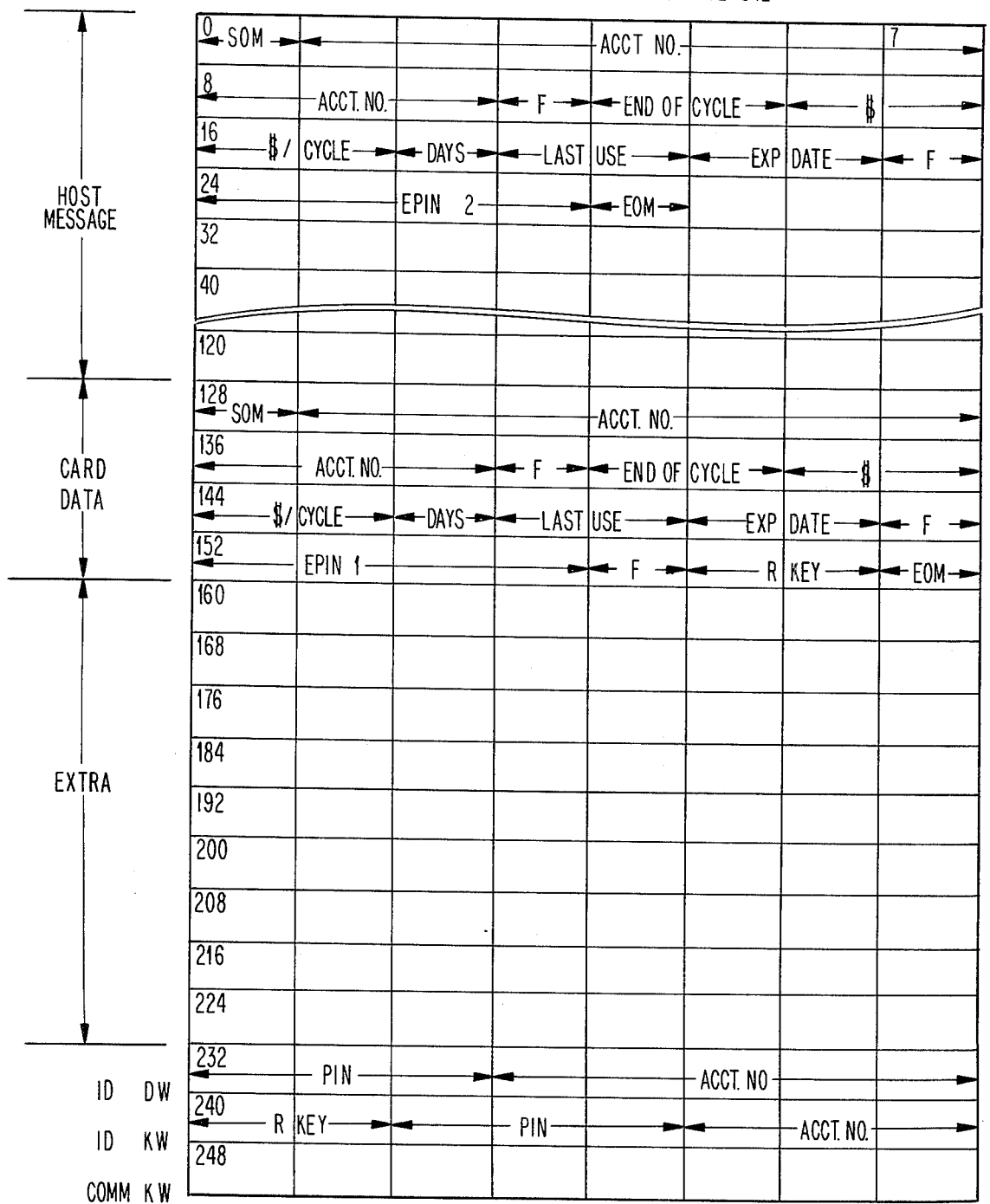
FIG. 9 is a diagram of the content of memory 117 at the end of sequence state S11.

As shown in FIG. 9 at an exemplary sequence state S12, memory 117 is divided into several buffer areas to increase the security within the terminal. For example, the host message buffer includes memory locations A0 through A127 and accordingly, as shown in FIG.7, the most significant bit of the address bit pattern must be zero in order that information be transmitted over communication lines from a location or to a location in the host message buffer of memory 117. Likewise, the identification card buffer includes address locations A128 through A159 and accordingly, the address bit pattern, as shown in FIG. 7, must have a one in the most significant bit position but zeros in all address bit positions 4 through 64 in order to allow card encode or card read data flow. Of even more significance to the security of the terminal is the fact that the only operations which are allowed at memory address locations A232 through A255 are keyboard input operations and encrypt/decrypt operations. The keyboard operations are controlled by keyboard control logic 205 to provide information such as the personal identification number (PIN) or the communication encrypting key C and the encrypting operations are controlled by data encryption standard control logic 207. None of the other control logic units is allowed to operate when the address counter includes the high order bit patterns shown in FIG. 7 for the ID data word IDDW or either of the keywords KW.

Referring again to FIG. 3, the outputs of sequence counter 201 are decoded by display light logic 209 which individually or in combination illuminates predetermined messages 211 to the terminal operator to prompt the terminal operator to enter certain information or to inform the terminal operator of certain status conditions of the terminal or of the transaction. The logic within display light logic 209 is straightforward decoding AND/OR gates to provide one or more outputs as called for by the state of the terminal as determined by the sequence bus bit pattern.

Directing attention again to keyboard control logic 205, an input labeled KATTN is connected to the keyboard so that an attention signal can be received whenever a byte of information has been accumulated in the keyboard output buffer within the keyboard itself. Keyboard control logic 205 also includes the sequence bus and the address bus inputs allowing the keyboard control logic to determine whether the terminal is in a state during which it is capable of accepting information from the keyboard via the storage bus in (SBI). If the sequence state of the terminal and the memory address to which the keyboard information will be stored meet with the predetermined operating conditions established for the terminal, a response signal KGATE is sent to the keyboard to gate the data in the keyboard output buffer onto storage bus in (SBI) to the memory. The keyboard control logic 205 is also connected to SBI and therefore can monitor the information received from the keyboard and may change the sequence state of the terminal via the SETS lines connecting keyboard control logic 205 to sequence counter logic 201. The SETS line will be used, for example, when an issue mode function key has been depressed. In that event, the sequence state of the machine will be changed to the issue mode. Likewise, signal lines labeled SETA are connected between keyboard control logic 205 and address counter logic 203 to set the address counter to predetermined values as necessary to load the information being received from the keyboard into the proper memory buffer locations. The SETA signals are generated by detailed gates similar to gates 419–425 of FIG. 13, which are well known in the art. During normal sequential operation, the address counter is incremented and the sequence counter is incremented by the two signal lines labeled INCRA and INCRS respectively. Keyboard control logic 205 also includes a data transfer register similar to register 409 of FIG. 12.

Similar input and output lines are provided to data encryption standard control logic 207, print control logic 213, magnetic stripe reader encoder (MSR/E) control logic 103 and communications control logic 107. Each of these control logic units must respond to the sequence state and memory address conditions of the terminal to control input output units or the encrypting circuits, and advance or otherwise change the state and memory address of the terminal as the operation controlled by the control logic unit progresses and is completed. By way of example, the detailed circuits and signal lines connected thereto within the communication control logic 107 will be described in detail with reference to FIG. 11.

Figure 11:
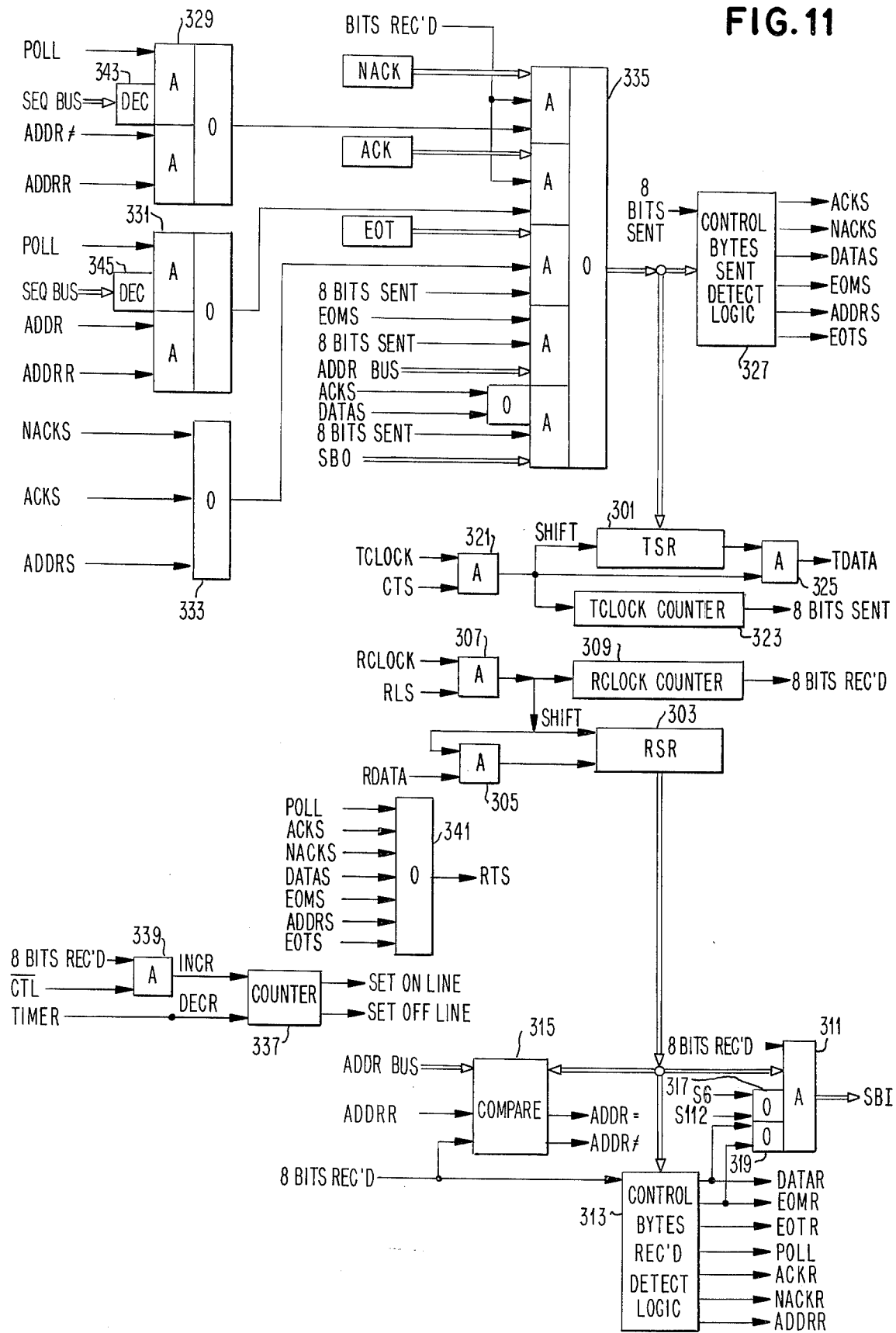
FIG. 11 depicts the circuits of control logic 107 as exemplary of circuits within the skill of the art which may be used to embody the control logic of terminals 20 and 40.

With reference to FIG. 11, an example of detailed circuits to implement a preferred embodiment of the communication control logic 107 in accordance with the RS 232 standard is set forth. The heart of communication control logic 107 is serializing transmit shift register 301 and deserializing receive shift register 303. Receive data (RDATA) received from modem 105 enters AND gate 305 and is serially shifted into receive shift register 303 by pulses from AND gate 307 which provides a pulse whenever the receive line signal (RLS) and the receive clock (RCLOCK) signals coincide. AND gate 307 also advances RCLOCK counter 309 which provides an 8 BITS REC'D output whenever eight bits have been received and shifted into receive shift register 303. The 8 BITS REC'D output from receive shift register 303 goes three different directions, to storage bus in via AND gate 311, to control byte received detect logic 313, and to compare 315. OR gates 317 and 319 condition AND gate 311 to gate the contents of receive shift register 303 onto storage bus in whenever a data word or an end of message word has been detected during sequence states S6 or S112 when messages are expected from the host computer. Compare circuit 315 compares the content of receive shift register 303 with the address bus whenever the control bytes received detect logic 313 indicated that the byte in receive shift register 303 in an address byte. Compare 315 provides an output labeled ADDR= to indicate that the count of bytes sent by the host computer is equal to the count of bytes received as indicated by the address of the memory or alternately provides a signal on output labeled ADDR≠ if the compare condition is not met. The output of control byte detect logic 313 includes signals on lines such as those labeled POLL, ACKR, EOTR, etc., which are directly detected and signals on lines labeled DATAR, and ADDRR which are inferentially detected. For example, any byte which is not a control byte such as an end of message or an acknowledge byte is assumed to be a data byte and the DATAR signal is provided unless the non-control byte follows an EOM byte in which case the non-control byte is assumed to be the length count which is indicated by a signal on the ADDRR line.

In a manner similar to that explained for the receive logic, data is shifted out of transmit shift register 301 under control of gate 321. Gate 321 provides an output whenever clear to send (CTS) and TCLOCK signals are simultaneously received from the modem. As bits are shifted out of transmit shift register 301 and gated to modem 105 over the TDATA line, they are counted by TCLOCK counter 323. After eight bits have been sent, a signal output labeled 8 BITS SENT is provided to control gates 335 to reload shift register 301. As shift register 301 is being reloaded, control bytes sent detect logic 327 monitors the bit pattern of the byte being loaded and a latch is set providing an output identifying the byte which is in the process of being transmitted so as to provide sequential continuity in transmission of bytes in accordance with communication protocol. For example, if a poll byte has been received and detected by control bytes received detect 313, AND gate 329 is operative to load transmit shift register 301 with the NACK byte if the terminal is not in sequence states S5, S6, S13, S14, S111, S112. Alternately AND gate 331 is operative to load transmit shift register 301 with the ACK byte if the terminal is in sequence states S5, S6, S13, S14, S11, S112. Sequence states are decoded by decodes 343, 345 and provided to AND gates 329, 331 respectively. Having loaded transmit shift register 301 with a NACK or alternately an ACK byte which is in the process of being transmitted, control bytes sent detect logic 327 will provide the corresponding identified output. In response to the outputs from control bytes sent detect logic 327, OR gate 333 enables one of gates 335 to load the end of transmission byte following the transmission an ACKS, NACKS, or ADDRS byte.

The communication control logic 107 determines whether the terminal is on line or off line by the use of counter 337. When a carry out signal is generated by counter 337 the terminal is considered to be on line and when the most significant bit is a binary zero, the terminal is considered to be off line. If the terminal is not in the process of logging information on tape 42, an output is provided by AND gate 339 whenever eight bits are received which increments counter 337. If the terminal is logging information to tape 42, the not clear to log (CTL) signal will be inactive blocking gate 339. Counter 337 is periodically decremented by a timer which provides a decrement signal at a sufficiently low frequency so that in normal on line operating conditions, at least one poll byte or information byte would be expected from the host computer between each timer decrement signal causing the contents of counter 337 to move up and down slightly, but remain at its highest level count because counter 337 does not roll over. If the eight bits received signal is not generated for a sufficiently long time period so as to allow the timer to decrement the counter down through half of its stored value, the most significant bit will turn off. In this manner, several poll signals will now have to be received before counter 337 is incremented so that a carry out is generated and in this way the terminal avoids coming on line during intermittent communication attempts.

The request to send signal to modem 105 is generated by OR gate 341 in response to a received poll or any of the six control bytes sent detect signals.

Other control logic 103, 111, 205, 207, and 213 are implemented using the same design techniques as logic 107. In particular, control logic 103, 111, and 213 have output lines in this preferred embodiment which have functions analogous to the output lines of logic 107. Examples are request to encode (RTE), clear to encode (CTE) read card signal (RCS), request to log (RTL), clear to log (CTL), request to print (RTP), clear to print (CTP), etc. Because tape log logic 111 is so closely associated with communication control logic 107, one being operative when the terminal is off line and the other when the terminal is on line, it can be seen that logic savings are acheived by sharing many of the logic circuits as shown in FIGS. 2 and 3. In effect, all of the outputs from logic 107 to modem 105 are routed to tape log logic 111 along with the off line signal to write tape when the terminal is off line instead of transmitting to the host computer.

Figure 10A:
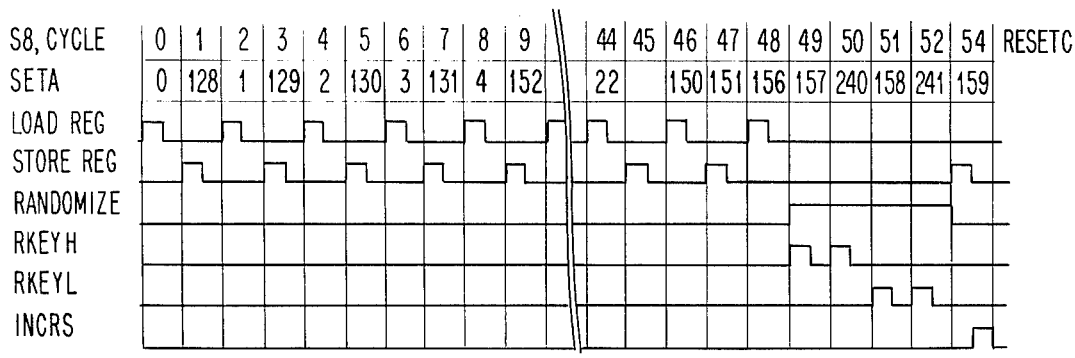
FIGS. 10A, 10B, and 10C are timing charts showing the operation of DES control logic 207 to move data and load and unload encrypt logic 115 during sequences S8, S10 and S106 respectively.
Figure 10B:
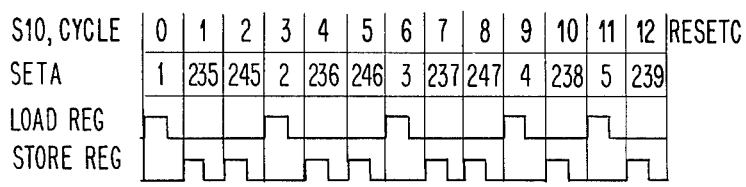
Figure 12:
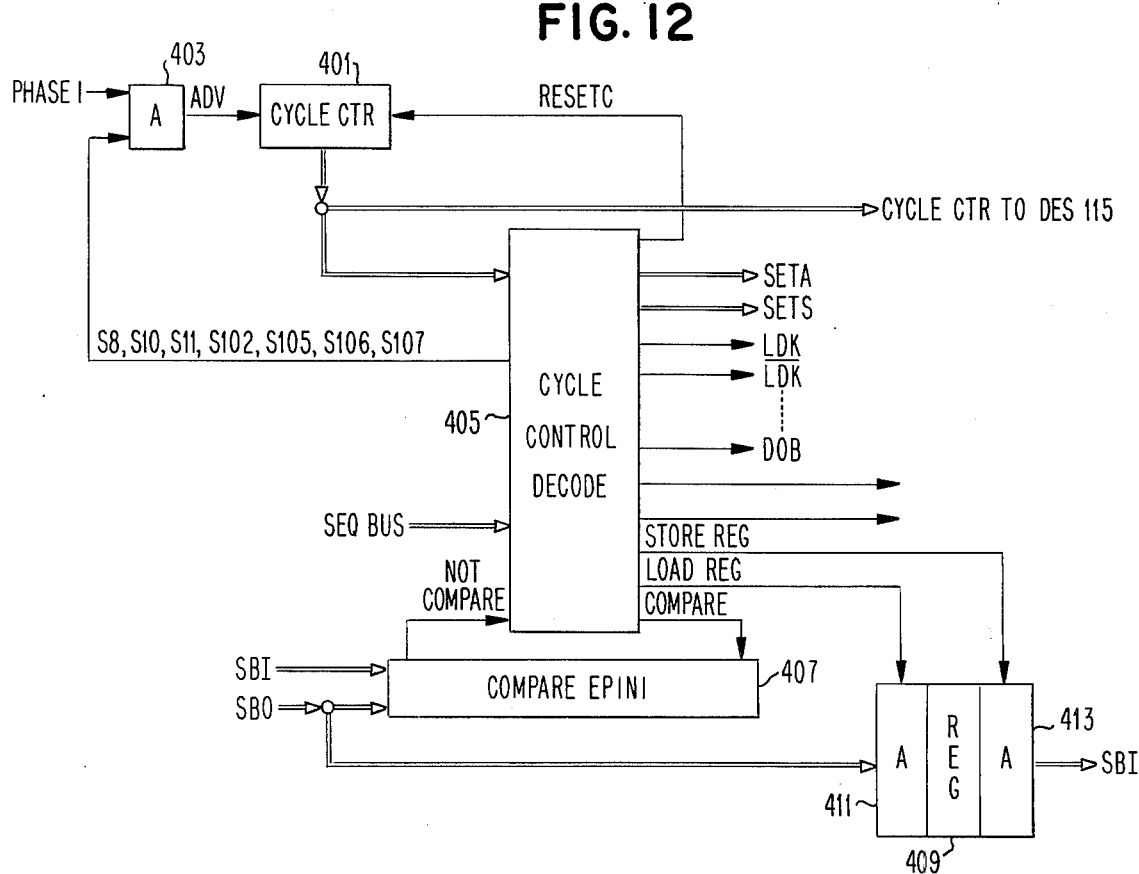
FIG. 12 shows additional exemplary circuits which may be used to embody control logic 207.
Figure 10C:
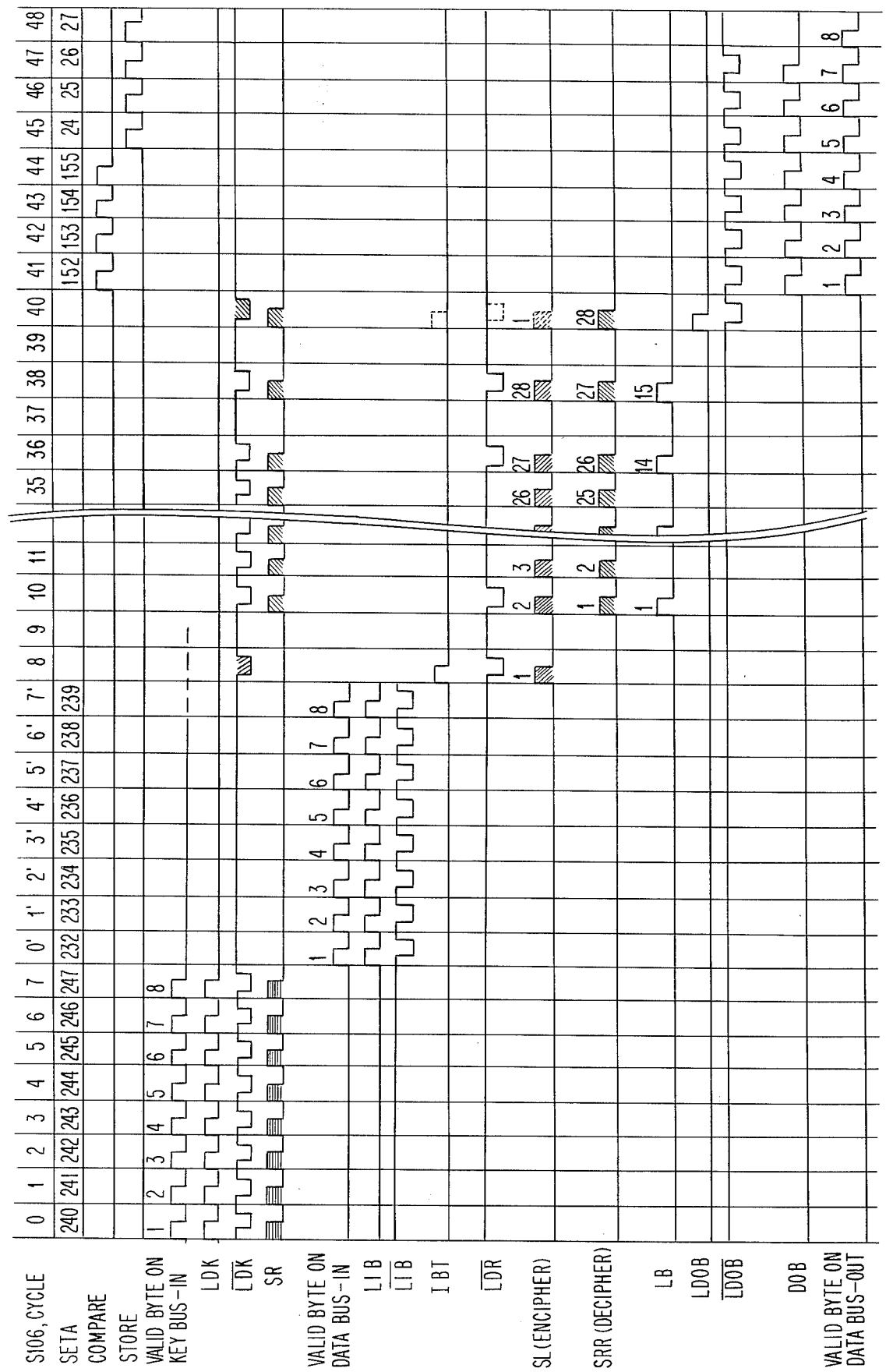

DES encrypt control logic 207 circuits shown in more detail in FIG. 12 are implemented in much the same manner as that described in detail for logic 107 with data being passed between memory locations to set up the ID data word IDDW and ID key word IDKW as well as passing these words to and from the DES encrypt unit 115, one byte at a time as shown in the timing diagrams of FIGS. 10a through 10c. A major difference in the logic 207 from that of logic 107 is that logic 207 is synchronously controlled by cycle counter 401 shown in FIG. 12. Communication control logic 107 on the other hand must be asynchronously responsive to conditions of the communication line and control information contained within the data being communicated.

Figure 5:
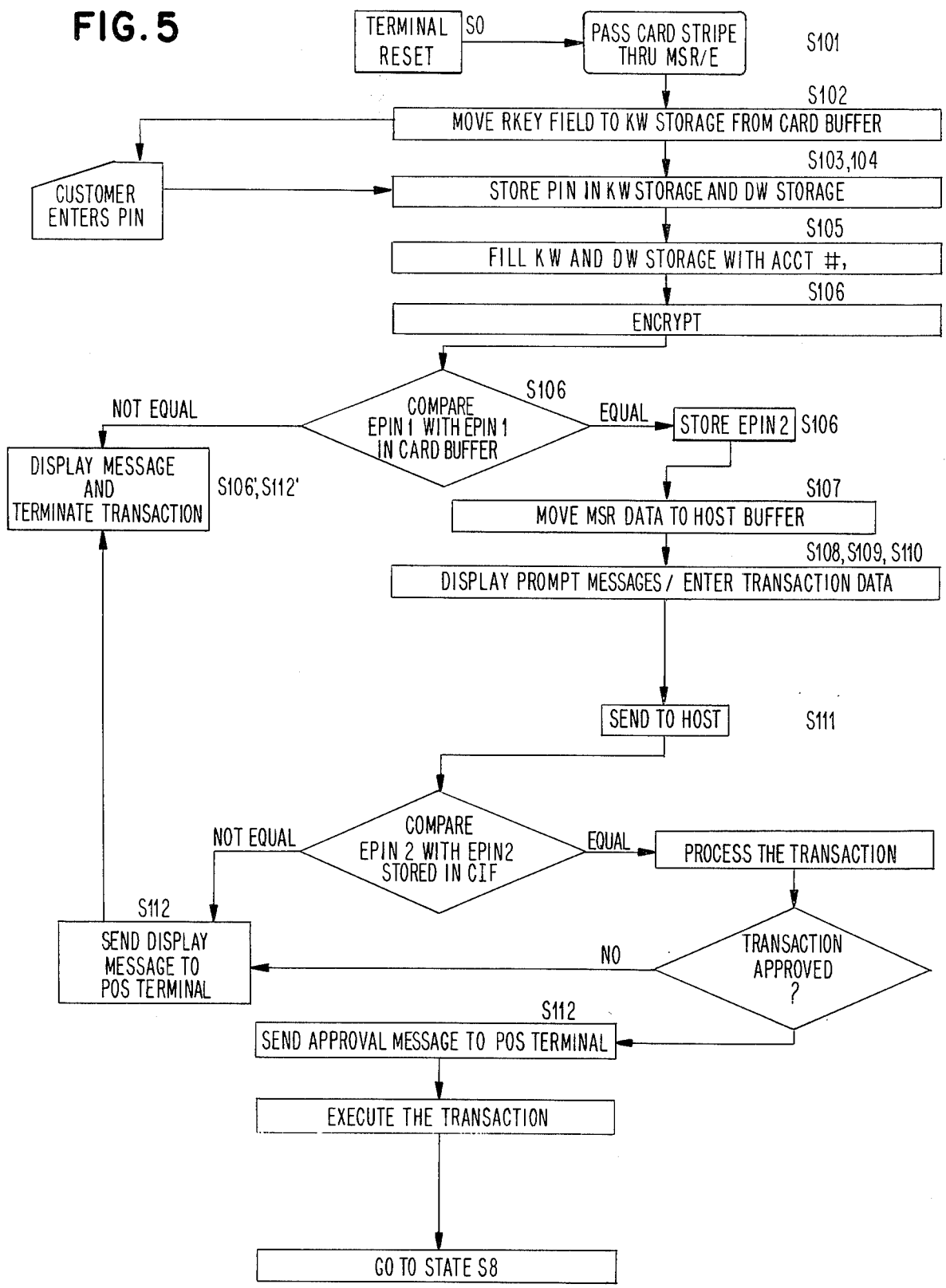
FIG. 5 is a flow diagram showing the steps of operation of the preferred embodiment of the system of the invention to use an identification card to verify the identity of the person presenting the card.

Referring again to FIG. 12, cycle counter 401 is advanced at the beginning of each cycle by the first phase of a fourphase clock of the type described with respect to FIG. 5 of U.S. Pat. No. 3,958,081. AND gate 403 controls the advance of cycle counter 401 so as to allow advance only during those sequence states S8, S10, S11, S102, S105, S106, and S107 when the state of the terminal is such that the services of data transfer betweeen memory locations, or encryption of data is required. Cycle control decode 405 decodes the sequence states presented on the sequence bus and the cycle count from the cycle counter to provide the control signals to control the cycle counter, 401, compare logic 407, data transfer register 409, DES 115, RKEY counter logic 215, etc. Data transfer register 409 accomplishes movement of data from one portion of memory 117 to another. Data is loaded into register 409 from the memory storage out bus SBO through AND gates 411 and is transferred from register 409 to storage bus in SBI by AND gate 413.

Example circuits for implementing the detailed functions provided by cycle control decode 405 are shown in FIG. 13. A first set of AND gates 415 is provided to decode each of the sequence states distributed on the sequence bus into discrete signals on discrete wires such as S8, S10, etc. shown by way of example. Likewise another set of AND gates 417 decodes the output of cycle counter 401 into discrete signals on discrete wires as shown. The output signal from gates 415 and 417 control other gates 419, 421, and 423 which generate signals indicating memory address locations to be accessed and which are used as inputs to further control signal generating gates such as gates 427 through 439. As can be seen in FIG. 13, the outputs of gates 419 are labeled with the addresses to be generated during sequence state S10. These addresses are generated by OR gates 425 which provide the individual signals on the SETA bus to set the address counter 203 to the address of the memory to be acessed. OR gate 441 provides pulse width control for the control signals generated by gates 427 through 439 so that information is presented to or read from the memory and DES 115 in synchronism with the memory and DES circuits. Only part of gates 425 through 437 are shown in FIG. 13 to make it clear that many additional conditions provide the respective output in addition to those conditions expressly illustrated as examples. Gates 439 are an example of one of the many gates which reset the cycle counter 401 at the end of the execution cycle of the sequence state being executed. For example, with reference to FIG. 10b, it can be seen that sequence state comprises the thirteen cycles of 0-12. During cycle 12, gates 431 generates an output to cycle counter 401 labeled RESETC to reset cycle counter 401 to 0. The same output of AND gate 431 is also connected to the INCRS input of sequence counter 201 to increment sequence counter 201 from sequence state S10 to sequence state S11.

In addition to encrypting the characteristic information, which in this embodiment is a memorized personal identification number (PIN), it will be recognized that the steps of encrypting messages to the host computer and decrypting messages from the host computer can be accomplished using the same encrypt unit 115 in accordance with the teachings of U.S. Pat. No. 3,958,081. As also described under the heading of background of the invention, the DES encrypt control logic 207 can be implemented to concatenate time varying information with the message data in the host message buffer prior to encryption and transmission. Each of these additional security steps are known in the art and will not be further elaborated upon here.

OPERATION OF THE PREFERRED EMBODIMENT

Card Issue Mode

Figure 4:
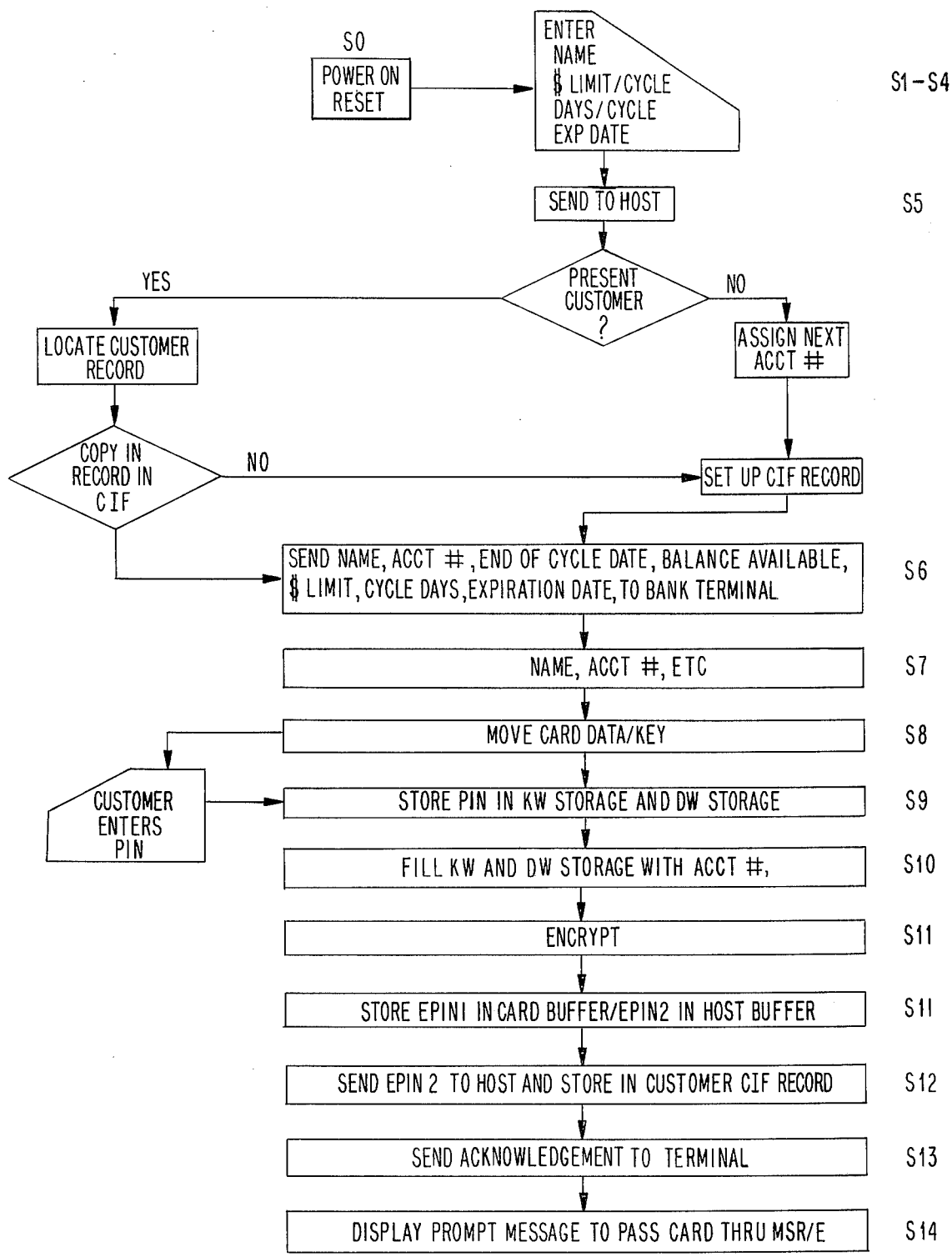
FIG. 4 is a flow diagram showing the steps of operation of the preferred embodiment of the system of the invention to prepare an identification card and table entry.

With reference to FIG. 4, the operation of the system of the invention to issue an identification card in accordance with the method of the invention will be described. When the power is turned on at the card issuing terminal, a power on reset circuit well known in the prior art issues a signal to set all latches and counters to zero state thereby initializing the terminal to sequence state S0.

In order to place the terminal in the issue mode, an issue mode function key is depressed. Depression of the key causes a keyboard attention (KATTN) to be generated which is received by the keyboard control logic 205. If the state of the terminal is such that the memory is not being used for other purposes, e.g., if the sequence counter is at any of the states S0-S4, the keyboard control logic 205 generates a gate signal (KGATE) to the keyboard which causes the keyboard to gate a byte of information which represents the depressed key onto the storage bus in (SBI). The gated byte of information (IM) is received by the memory and stored in the first address location A0 and is also received by the keyboard control logic 205. If the keyboard control logic 205 decodes the byte of information from the keyboard as the issue mode function key, the issue mode latch which is part of the sequence counter 201 is set and the sequence counter is advanced to the state S1 by the signal lines labeled SETS. When the sequence counter is at state S1, the display light logic 209 illuminates the enter name light on the display panel 211.

In reponse to the illuminated enter name light, the person issuing the identification card then begins entering the customer's name. Each alphabetic character entered generates a keyboard attention (KATTN) to the keyboard control logic 205, which in turn generates a keyboard gate signal (KGATE) because the terminal is in state S1. Each time a character is received and the keyboard control logic 205 decodes the character as alphabetic, the character is stored in the memory location currently being addressed, and the address counter 203 is incremented. If the terminal state is S1 and the address counter has reached A27, a field separator character is expected from the keyboard. If the logic 205 decodes the 28th character received from the keyboard as a non-field separator character, the reenter field latch of the sequence counter 201 is set and the address counter 201 is reset to the beginning of the field, in this case, address A1. The field OVERFLOW/RE-ENTER light is illuminated by the display light logic 209 whenever the re-enter field latch is set. If the keyboard control logic 205 decodes the character on the storage in bus as a field separator, both the sequence counter 201 and the address counter 203 are incremented to S2, A28. When the sequence counter is at state S2, the display light logic 209 illuminates the light labeled $ PER CYCLE, and the person entering the identification card is expected to key enter the numeric dollar limit which the customer or the issuing institution wishes to place upon the customer's electronic funds or credit authorization activity during any one cycle period. Entry of the numeric dollar limit again causes a KATTN for each key stroke which results in a KGATE signal transferring each byte to the storage in bus for storage in sequential address positions as the address counter 203 is advanced for each numeric character detected by the keyboard control logic 205. If the keyboard control logic 205 decodes an input character as a non-field separator and the address counter is at position A31, the field overflow latch of the sequence counter 201 is set and the display light control illuminates the field OVERFLOW/RE-ENTER indicator and the address counter is returned to A28. Each time the keyboard logic 205 decodes the input characters from the keyboard as numeric while the sequence counter is at S2, the address counter is advanced. If while in sequence S2, the keyboard logic 205 decodes an input character from the keyboard as a field separator, both the sequence counter and the address counter are advanced to S3 and A32 respectively. In like manner, the two digit time cycle length in days is entered into address locations 32, 33. Also in like manner, the two digit month is entered into positions 35 and 36 and a two digit year is entered into address locations 37 and 38 to indicate the expiration date of the identification card. When the state of the terminal is at sequence S4 and an end of message byte from an enter or send key is detected by the keyboard logic 205, the sequence counter is advanced to S5 and the address counter is reset to A0.

When the sequence counter is at count S5, the PROCESSING light is illuminated by the display light logic 209.

During sequence S5, the message entered during sequences S0-S4 is transmitted to the host computer for processing. Transmission to the host is controlled by the communication control logic 107 which interfaces to a modulator/demodulator 105 by, for example, a standard interface such as RS232C. It will be assumed for purposes of the example of this embodiment that the host computer periodically polls each terminal on a leased line to avoid the need for obscuring this description of the preferred embodiment with more complex communication architectures, it being well understood that any form of communication architecture may be employed so long as messages are reliably transmitted between the host computer and a terminal using the identification card and identification verification method of the instant invention. In the polling environment, the host computer sends a poll address to each terminal in a repetitive sequence. In the usual example, the communication control logic within each terminal responds with a non-acknowledgement (NACK) and an end of transmission (EOT) to each poll address which is recognized by the communication control logic as that of the terminal, whenever the terminal does not have information to transmit (e.g., is not in state S5). Alternatively, if the terminal has information to transmit, an acknowledge (ACK) byte is transmitted followed by the information message, a length count, and the EOT byte. Because sequence state S5 is associated with issuing an identification card and because information from the host computer is needed for the issuing process, a card cannot be issued if the terminal is in an off line mode. Off line status may be detected by a time out circuit which provides an off line output signal if a poll or message byte is not received from the host computer within a reasonable expected time. For example, if under normal circumstances, a poll can be expected from the host computer at least every 10 seconds, the time out circuit may be responsive after one minute to provide the off line signal. The off line signal may be used to set an off line latch as part of the sequence counter 201 which would be decoded by the display light logic 209 to extinguish the PROCESSING light and illuminate the OFF LINE light. In response to the OFF LINE light, the person issuing the credit card could either abort the transaction and re-enter the required information later or could leave the terminal in sequence state S5 and attempt to correct the communication or other difficulty causing the off line status. The communication logic 107 upon receiving a series of poll messages such as six or more and responding to each poll message with the NACK, EOT byte in view of the terminal's off line state, may change the state of the terminal from off line to on line at which time the originally entered message will be transmitted if the transaction had not been aborted by the terminal user.

Whenever the terminal is in sequence state S5, the communication logic 107 is activated to attempt to transmit the information from the host communication portion of the memory beginning at address location A0. As previously mentioned, when the next poll message is received from the host computer, the communication logic 107 responds by raising request to send (RTS). The modem 105 replies with clear to send (CTS) and logic 105 transfers the ACK byte to the modem 105 over the transmit data (TDATA) line, one bit at a time, synchronized by the TCLOCK signals received from the modem. As the last bit of the ACK byte is being gated to the modem 105, the communication control logic 107 gates the data byte in the storage bus out register of memory 117 into the transmit buffer 301 of the communication control logic. The fall of the 8 BITS SENT signal shown in FIG. 11 advances the address counter 203 to the next sequential address position and causes the memory to read the data out from the address location to the storage bus out register of memory 117 in anticipation of the next 8 BITS SENT signal. Inasmuch as the modem will be operating at a speed not greater than 9600 bits per second, 104 microseconds are available between modem clock pulses which is more than ample time to transmit the byte of data from the memory storage bus out to the transmit buffer. The next transmit clock then gates the first bit of the first data byte to the modem and increments the clock counter. As the clock counter is being incremented for the eighth time while the eighth bit of the data byte is being gated to the modem, another 8 BITS SENT signal is generated causing the next data byte in the storage bus out register to be gated to the transmit buffer 301.

Each time a data byte is transferred to the transmit buffer 301, it is decoded by logic 327 in search for an end of message character EOM. When an end of message character is detected while being loaded into the transmit buffer 301, the end of message latch (EOMS) in logic 327 is set. When the last bit of the EOM byte is being gated to the modem while the EOMS latch is set, a byte of information from the address bus is loaded into TSR 301 as the length count. The current address position of the address counter is equal to the length count of the message being transmitted because the host communication buffer occupies the first memory positions of the terminal memory 117. When the last bit of the address count byte is being gated to the modem, the fall of the TCLOCK generates another 8 BITS SENT signal and the end of transmission character is gated to the transmit buffer 301 in the communication control logic to terminate the message transmission. The end of transmission latch EOTS also advances the sequence counter to sequence S6 and sets the address counter to A0 in preparation for receiving a message from the host computer during sequence state S6.

It is possible that when the message transmitted during sequence state S5, is completely received by the host computer, the length count does not agree with the number of bytes transmitted or in some other way, an error has been detected. In the event of an error, the host responds by transmitting NACK, EOT bytes which in effect request retransmission. When NACK, EOT bytes are detected by logic 313 in the communication control logic 107, the sequence counter 201 is set to sequence S5 and the entire message transmission process controlled under sequence S5 is repeated.

In the event that the message transmitted during sequence state S5 was received correctly at the host computer, the host computer processes the message in accordance with the flow diagram of FIG. 4 which usually requires less than two seconds compute time. After the host computer has processed the inquiry message and formulated a response message, an ACK byte is transmitted to the terminal followed by the data bytes of the response message, a length count, and an EOT byte.

Operation of the communication control logic 107 while receiving data is as follows. As soon as the modem 105 receives a signal from the communication line which exceeds a predefined noise threshold, the modem raises the signal labeled receive line signal (RLS) and provides a data bit at the RDATA output line synchronized with the RCLOCK. The communication control logic 107 gates each binary RDATA bit into the receive buffer using the RCLOCK as the gating signal. As each bit is loaded into the receive buffer 303, the contents thereof is shifted to accommodate the newly received data bits. After eight RCLOCK cycles which are counted in the RCLOCK 309 counter, the contents of the receive buffer is decoded and the POLL, ACKR, NACKR, or EOTR latch is set depending upon which if any of these characters were detected. If the acknowledge latch is set, the ACK byte is not stored but the DATAR signal is generated on the next 8 BITS REC'D signal. The 8 BITS REC'D signal gates the first response message byte which has been loaded into the receive buffer onto storage bus in and causes the memory 117 to store the byte at the address location specified by the address counter 203. The trailing edge of the 8 BITS REC'D pulse causes the address counter 203 to advance one count in preparation for storing the next byte received from the communication control logic 107 in the next sequential memory location. When an end of message byte is detected, the end of message latch (EOMR) is set and the end of message byte is transferred to the memory. When the EOMR is active, the next byte is considered to be the length count and is compared by the communication control logic 107 with the value of the address counter. If the address counter and the length byte received from the host computer are not identical, it is likely that the message has been received in error and an error latch in the modifier portion of sequence counter 201 is set. Thereafter when the end of transmission byte is detected in the receive buffer 303, a NACK byte is gated by the communication control logic 107 to the transmit buffer 301 and transmitted as previously described to the host computer followed by an EOT byte to indicate that the message was received in error and should be resent. Alternately, if the message is received with a length count equal to the address counter, the communication control logic transmits ACK and EOT bytes indicating this fact to the host computer. In addition to initiating NACK or ACK responses to the host computer, the detection of the EOT byte from the host computer causes the address counter to be set to A0. If the error modifier latch is not set when the EOT byte is detected, the EOTR is used to increment the sequence counter to sequence S7.

The purpose of sequence S7 is to print or otherwise display the response message to the person issuing the identification card so that potential errors in the customer's record at the host computer can be detected and action taken. The operation of the print control logic 213 is very analogous to that of the transmit section of the communication control logic 107. The printer chosen for the task, and the distance of the printer from the terminal determine the amount of similarity between the communication and print control logic. For example, if the printer is located some distance from the issuing terminal, a single coaxial cable may be a desirable low-cost connection requiring a serial bit by bit transfer of data from the memory to the printer for printing. On the other hand, if a byte wide bus is available a counterpart of the TCLOCK counter of the communication control logic will not be needed in the print control logic because serialization of each byte will not be necessary.

When the print control logic 213 detects the sequence state S7 a request to print (RTP) signal is sent to the printer to bring the required motors up to speed and position the paper at a new page, etc. depending upon the details of the printer itself. When the printer is up to speed, the clear to print (CTP) signal is received from the printer, the print control logic 213 causes the first byte of the response message from the host computer stored in memory location A0 to be transferred from the storage bus out to the printer. After the 8 bits have been transferred, the address counter is incremented to the next sequential address position and the data at the next sequential address position is read out of the memory location and stored into the storage bus out register of memory 117 in preparation for being gated to the printer by the print control logic 213. As each byte of information is gated to the printer, the print control logic 213 attempts to decode each byte and when a field separator or an end of message byte is detected, the RTP signal is dropped. The fall of the RTP signal causes the printer to physically print the contents placed in its buffer by the print control logic 213. Also, the sequence state counter 201 is incremented to S8 by the fall of RTP.

With reference to FIG. 10A, the operation of DES control logic 207 will be described. During sequence state S8, the account information received from the host computer during state S6 is transferred from the host buffer memory location to the card buffer memory locations. In addition, the random number (RKEY) which has been continuously generated by the random number counter 215 is frozen at its present value for the duration of cycles 49, 50, 51 and 52 to allow this two-byte random number to be transferred into card buffer memory locations A157 and A158 as well as encryption key locations A240 and A241.

Data is transferred from the host buffer to the card buffer through register 409 shown in FIG. 12 by gates 411 and 413 controlled by LOADREG and STOREREG signals respectively. The LOADREG and STOREREG signals are generated by gates 427 and 429 respectively, shown in FIG. 13. The randomized signal is generated by gate 437. The randomized signal acts to inhibit counting by RKEY counter 215. In this way, any number of asynchronously occurring inputs can be connected to gate 437 so as to make the output of counter 215 be a random number. Of course, it is recognized that other forms of random number generation may be used. The RKEYH and RKEYL signals are generated by gates 433 and 435 respectively to cause the logic of RKEY counter 215 to place the high order and low order bytes of the RKEY on the storage bus in in sequence as shown in FIG. 10A. During sequence S8, cycle 54 an end of message byte is loaded into address location A159 during phase times 1 and 2. During phase 4 of sequence 8 cycle 54, gates 439 generate the signal labeled INCRS which increments the sequence counter 201. This same signal is also labeled RESETC and is connected to cycle counter 401 to reset cycle counter 401 in preparation for execution of the next synchronous operation of logic 207.

Sequence state S9 is again decoded by the keyboard control logic 205 to activate the personal identification number key pad 21 attached to the terminal to allow the customer to whom the identification card is being issued to confidentially enter a personal identification or secret number without the need for even the person issuing the identification card to know the value of the personal identification number. Also the display light logic 209 responds to sequence state S9 to illuminate the ENTER PIN indicator. Because the PIN key pad 21 encodes each numeric key stroke into a four binary bit hexidecimal code, a six decimal-digit PIN only occupies 3 bytes which are stored in a three-byte register in the key pad until all six digits have been entered. If the customer makes a mistake while entering the PIN, a cancel key is provided to reset the contents of the register to a predetermined value such as all zeros, all ones, alternating ones and zeros, or any other pattern. If a four decimal-digit PIN is allowed, these preset value bits will fill out the four-decimal character PIN to the full three-byte number whenever the four-decimal character PIN is entered by the customer. After the customer has determined that the correct PIN is properly entered, the customer depresses the enter function key which causes a KATTN signal to the keyboard control logic 205 and transfers the first byte representing the first two decimal digits to the keyboard output buffer in the keyboard from which it is gated by the KGATE signal to storage location A232. At the fall of the KGATE signal, the address counter is incremented and the second byte of PIN data is tranferred to the output buffer in the keyboard causing another KATTN signal. In like manner, the second byte is transferred to storage location 233 and a third byte is transferred to storage location 234.

After having been stored at IDDW locations A232, A233, and A234, the keyboard control logic duplicates the PIN into IDKW locations A242, A243, and A244 as shown in FIG. 9.

In order to provide the full eight bytes for the IDDW data word and the IDKW keyword, sequence S10 causes each of these eight byte words to be padded or filled out with portions of the account number in this preferred embodiment. Padding is accomplished by the DES control logic 207 of the control logic 119 as shown in FIG. 10B. Logic 207 receives the first byte of the account number from the storage out bus and transfers it first to storage location A235 and next to storage location A245. This operation is repeated with the second and third bytes of the account number whereas the fourth and fifth bytes of the account number are transferred only to storage locations A238, A239 respectively. In this manner the account number has been concatenated to the three-byte PIN to provide an eight byte data word and the PIN and a small portion of the account number has been concatenated to the RKEY to provide an eight byte ID key word, both of which are used by the data encryption standard encrypt circuits 115 described in U.S. Pat. No. 3,958,081. At the completion of ID data word and ID key word concatenation, the sequence counter 201 is incremented to sequence state S11.

During sequence state S11, the ID data word and the ID key word are transferred from memory to the data encryption standard circuits 115, encrypted, and the first 4 bytes representing EPIN1 of the encrypted results are stored in the ID card memory area. The other 4 bytes EPIN2 of the encrypted results are stored in the host communication storage area of memory.

Encrypting means of U.S. Pat. No. 3,958,081 includes three series of pulses labeled LIB, LDK and DOB which are generated by gates similar to gates 427 through 439. These signals shown in FIG. 10C are the same as those generated by the timing and control units shown in FIG. 3B of U.S. Pat. No. 3,958,081 to load the data word DW, the key word KW, and to provide the encrypted output word respectively, one byte at a time. In order to utilize the means of U.S. Pat. No. 3,958,081 in the instant invention, the timing and control unit signals must be slightly modified so as to load the key word and the data word in sequence rather than simultaneously from a separate key register and data register as taught in U.S. Pat. No. 3,958,081. With reference to FIG. 10C and in comparison with FIG. 7A of U.S. Pat. No. 3,958,081, it will be noted that the signals LDK, $\overline{LDK}$ and SR occur during cycles 0 through 7 corresponding to FIG. 7A of U.S. Pat. No. 3,958,081. On the other hand, timing and control unit signals LIB, and $\overline{LIB}$ occur delayed in time during cycles 0' through 7' while sequential bytes of the data to be encrypted are provided on storage bus out which is connected to data bus in for the duration of cycle 0' through 7'.

Detailed steps by which each data byte of the eight byte ID data word and each byte of the eight byte ID key word are transferred into the data word buffers 100 and 150 and the key word buffers 350 and 400 are described at columns 12, 13 and 14 of U.S. Pat. No. 3,958,081. This detailed description of Pat. No. 3,958,081 applies equally well to FIG. 10 of this specification with the exception that the ID data and ID key word are loaded sequentially instead of at the same time.

Upon completion of the encryption cycles, an eight byte encrypted data output word is made available one byte at a time from the encryption unit 115. Each byte from the encryption unit is available in synchronism with the signals DBO. During the first four DBO pulses, of sequence S11, each of the four presented bytes are stored in card buffer memory locations A152 through A155. The remaining four bytes of encrypted identification data are stored in host buffer memory locations A24 through A27 for transmission for the host computer as EPIN 2 during sequence state S12.

Operation of the memory address counter and the communication control logic during sequence state S12 is substantially identical to their operation during sequence state S5 and therefore the details thereof will not be repeated except to say that the entire message received from the host computer during sequence state S6 is returned to the host computer for comparison checking. The four byte EPIN2 is concatenated with this returned message for storage in the customer information file record identified by the customer's account number.

During sequence state S13, an acknowledgement is received by the issuing terminal if the length count and other message check operations indicated a correct message which caused the sequence counter to increment to sequence state S14.

During sequence state S14, the display light logic 209 illuminates the ENCODE CARD indicator to prompt the terminal user to pass an identification card through the magnetic stripe reader encoder so that the data accumulated in memory locations A125 through A159 may be written onto the third stripe of the identification card.

Card Use Mode

With reference to FIG. 5, the operation of the system of the invention to use an identification card in accordance with the method of the invention will be described. It is assumed that the terminal is in sequence state S0, power having been recently turned on to generate a power on reset signal or a reset switch having been depressed to accomplish the same function of setting all latches and counters to zero state, thereby initializing the terminal to sequence state S0.

In order to place the terminal in the use mode, a use mode function key is depressed. Depression of the use mode function key causes a keyboard attention (KATTN) to be generated which is also received by the keyboard control logic 105. Since the terminal is in state S0, the keyboard control logic generates a gate signal (KGATE) to the keyboard which causes the keyboard to gate the byte of information which represents the depressed use mode key onto the storage bus in (SBI). The gated byte of information is received by the memory and stored in the first address location A0 and is also received by the keyboard control logic. If the keyboard control logic decodes the byte of information from the keyboard as the use mode function key, the use mode latch which is part of the sequence counter is set and the sequence counter is advanced to state S101 by the signal lines labeled SETS. When the sequence counter is at state S101, the display light control logic illuminates the READ CARD light on the display panel 211.

In response to the illuminated READ CARD light, the clerk executing the transaction passes the customer's card stripe through the magnetic stripe reader encoder (MSR/E). The data on the card is read into memory locations A128 through A159 as shown in FIG. 9. When the end of message (EOM) byte is recognized by the MSR/E control logic 103, the sequence counter 201 is incremented by the signal lines labeled INCR SEQ while the end of message character is transferred to the memory. After being incremented, the sequence counter is at state S102.

During sequence state S102, the RKEY at memory locations A157, A158 is moved to IDKW locations A240, A241 respectively by the DES control logic 207 and the sequence state is incremented to S103.

During state S103, the display light control 209 illuminates the ENTER PIN indicator to prompt the customer to enter his secret personal identification number at the key pad 21. As previously described, the customer will then enter a four decimal digit or a six decimal digit personal identification number, and after determining that it has been properly entered, will depress an enter function key which causes a KATTN to the keyboard control logic. The KATTN signal in conjunction with sequence state S103 causes the keyboard control logic 205 to generate a KGATE signal to transfer the first byte representing the first two personal identification digits to location A232 of the memory. At the fall of the KGATE signal, the address counter 203 is incremented and the second byte of PIN data is transferred to the keyboard output buffer causing another KATTN signal. In like manner, the second byte is transferred to storage location A233 and the third byte is transferred to storage location A234.

In order to increase the difficulty of decrypting information on the identification card or in the host computer to obtain the PIN, the PIN is made part of the keyboard IDKW at storage locations A242 through A244. This data transfer is again accomplished by the DES control logic 207 during sequence state S104 in the series of steps previously described. During sequence state S105, a portion of the account number beginning at storage location A129 is concatenated with the data word IDDW beginning at storage location A235 and the key word beginning at storage location A245 to fill out or pad these words to a full 64 bits each prior to encrypting. At the completion of the ID data word and ID key word concatenation, the sequence counter is incremented to sequence state S106.

Referring again to FIG. 10C, the execution of sequence S106 will be described. During sequence state S106, the ID data word and the ID key word are transferred from memory to the data encryption standard circuits 115, encrypted, and the EPIN1 first four bytes provided by the DES circuits are compared byte by byte in compare 407 with the EPIN1 bytes stored at card buffer memory location A152 through A155. If the first four bytes provided by the DES 115 are the same as EPIN1 read from the ID card, a first verification threshold has been met and the DES control logic is enabled to store the other four byte output EPIN2 from the DES circuits 115 in memory locations A24 through A27 for later transmission to the host computer. Alternatively, if the output EPIN1 from the DES circuits was not the same as the EPIN1 stored in the card buffer locations A152 through A155, the invalid modifier of the sequence number is set, modifying the sequence state to S106'. In state S106', the display light logic 209 illuminates the NOT VERIFIED indicator. The terminal remains in state S106' until the reset switch is activated to return the terminal to state S0.

Returning now to the first alternative wherein EPIN1 from the DES circuit was the same as the EPIN1 stored in memory locations A152 through A155, gate 439 of the DES control logic circuits 207 provide an INCRS signal to increment the sequence counter to state S107.

During state S107, the move data portion of keyboard control logic 205 is again activated to transfer the information read from the identification card and stored in locations A128 through A151 into the host message buffer storage locations A0 through A23. Use of keyboard logic to execute this transfer allows some saving of address generation SETA gates. After the card data has been transferred to the host message buffer, the sequence counter is incremented to sequence state S108.

In sequence state S108, the display light logic 209 illuminates one or more indicators simultaneously or in sequence prompting the terminal user to enter transaction data. Examples of transaction data may include transaction type, transaction amount, and any other information that the host computer is programmed to recognize and will fit within the remaining space of the host message buffer beginning at location A28. The transaction information is received from the keyboard in the same manner as previously explained during the issue mode operation. A simple example of transaction data might be entered in a plurality of separate parts, a first part being a transaction type such as credit check or alternately funds transfer. This transaction type represented by a byte of information from the keyboard may be stored in the host message buffer location A28 and the sequence state counter incremented to sequence 109. During sequence 109, the display light logic may, for example, illuminate the transaction amount indicator and numeric amount information may be stored in host message buffer locations beginning at location A30. Other information may follow during sequence S110. When an end of message key is depressed the sequence state counter is again incremented to state S111 and the address counter is set to a count A0 in preparation for transmission of the identity verification and transaction information to the host computer during sequence state S111.

The operation of the terminal during sequence state S111 is identical to the operation of the terminal during the previously described sequence state S5 and accordingly the details of transmitting the message from the host buffer will not be repeated.

After receiving the message at the host computer, an application program such as a slightly modified Teller Control System for System/370 (program product #5798-ANH) will use the customer's account number to locate the customer's file in the central information file. After locating the customer's records, the EPIN2 field received from the terminal will be compared by the program with the contents of the EPIN2 field stored in the central information file as shown in the flow diagram of FIG. 5.

If the EPIN2 field received from the terminal is the same as the four byte EPIN2 field stored in the central information file for this customer's account number, the second verification threshold has been satisfied providing very secure evidence that the customer is actually is the person authorized to have access to the account. Alternately, if the four byte EPIN2 field received from the terminal is not the same as the four byte EPIN2 field stored in the central information file for this customer's account number, the second verification threshold test has been failed. This failure could have been caused by an undetected communication error or entry of the wrong PIN by the person presenting the card at the terminal. Regardless of the reason for failing to meet the second verification threshold, the transaction will not be processed by the program but rather an invalid ID message is formatted for transmission to the terminal.

After determining that the second ID verification threshold has been met, the on line teller program proceeds to process the requested transaction. This may include determining whether this transaction will raise the dollar amount of total transactions executed within this cycle time period to a level above the maximum dollars per cycle which the customer or the card issuing institution specified when the card was issued. Other tests might include too frequent use, and surely will include tests of the expiration date of the identification card and adequacy of the account balance to cover the requested transaction. All of these transaction processing steps are well known in the art of financial data processing and may be executed by a program such as the IBM 360 On-Line Teller Program. If any of these processing steps cause the transaction to be disapproved, a non-approved message will be formatted for transmission to the terminal. Alternately, if all tests are met an approval message is formatted for transmission to the terminal.

Actual transmission of the response message from the host computer to the terminal is virtually identical to that described earlier during sequence state S6 in the card issue mode. The primary difference is, of course, the content of the information message sent to the terminal. The host response message is received at the terminal during sequence state S112 and is stored in storage address locations beginning at address A0. At each byte of information is received from the host computer through the communication logic, the communication logic control byte detect logic 313 is active to detect message information bytes representing such control information characters as invalid, approved, disapproved, etc. In response to an invalid, not approved, or approved host message information byte, the communication logic 107 activates signal lines on the SETS bus to set corresponding modifier bits in the sequence counter 201 to modify the sequence state count of S112. The display light logic 209 acts upon the modified sequence state S112 to illuminate the indicator identified by the modifier bits. In the event that the transaction was not approved, the message from the host computer may include following bytes of explanation which may be printed if desired.

If the information message received from the host computer includes an approval byte as the first information byte, the person operating the terminal will take whatever necessary steps remaining to complete the transaction such as extending the necessary credit.

In order to increase the security provided by the identity verification system of the invention, a new random number RKEY encryption key freshly generated by logic 215 is used by DES115 to generate a new EPIN1 and a new EPIN2 for recording in the system. Therefore, while manual steps which may be necessary to completely execute the transaction are being performed, the sequence state counter jumps back to state S8 and repeats each of the steps previously recited during the card issue mode in order to generate a new EPIN1 and a new EPIN2. During state S8 a new random number RKEY which is continually being generated by the RKEY counter 215 is gated onto storage bus in for storage at address locations A240 and A241. During a next series of logic cycles, the DES control logic 207 moves a copy of the RKEY from storage locations A40 and A41 to card buffer storage buffer locations A257 and A258 so that a copy of this new RKEY will also be written onto the identification card along with the new EPIN1 to be generated. As previously, the new EPIN1 is transferred to storage locations A252 through A255 and the new EPIN2 is stored in memory locations A24 through A27. The EPIN2 is sent to the host and stored in the customer's central information file record identified by the customer's account number in place of the old EPIN2 which was used to verify the identity of the customer for the instant transaction. Acknowledgement is sent back to the terminal from the host computer which if not indicating an error, causes the display light logic to illuminate a prompting indicator to prompt the operation of the terminal to pass the identification card through the MSR/E to write the new EPIN1 and the new RKEY onto the card in preparation for the next use of the card.

While the identity verification system and method of the invention have been described with respect to a preferred embodiment thereof, it will be understood by those skilled in the art of data processing system design that various changes in form and detail of the elements of the system and steps of the method may be made without departing from the spirit and scope of the invention. For example, if desired, the more sophisticated DES algorithm may be replaced with a simpler scrambling or calculating method while still obtaining the benefits of the invention.

What is claimed is:

1. A method of using a secure identification card comprising the steps of:
    reading a personal encryption key and a partial result from said card;
    receiving characteristic characters related to a prospective user of said card;
    encrypting said characteristic characters with said key to obtain a result;
    comparing a first part of said result with said partial result read from said card to verify a first level of correspondence between said characteristic character and said card;
    denying use of said card by said prospective user if said first part compares unfavorably with said partial result;
    comparing a second part of said result with a second partial result stored at a central data base for said card, if said first part compares favorably with said partial result to verify a second level of correspondence between said characteristic characters and said card;
    denying use of said card by said prospective user if said second part compares unfavorably with said second partial result.

2. A method of using a secure identification card comprising the steps of:
    reading a key and a partial result from said card;
    receiving characteristic characters related to a prospective user of said card;
    calculating a result using said key and said characteristic characters;
    comparing a first part of said result with said partial result read from said card to verify a first level of correspondence between said characteristic character and said card;

denying use of said card by said prospective user if said first part compares unfavorably with said partial result;

comparing a second part of said result with a second partial result stored at a central data base for said card, if said first part compares favorably with said partial result to verify a second level of correspondence between said characteristic characters and said card;

denying use of said card by said prospective user if said second part compares unfavorably with said second partial result;

calculating a new result using said characteristic characters and a newly generated key if said second part compares favorably with said second partial result;

writing said newly generated key and a first part of said new result on said card in place of said key and said partial result on said card;

storing a second part of said new result at a central data base in place of said second partial result.

3. An improved identification card including human readable information fields and machine readable and writeable information fields wherein the improvement comprises:

a partial result field for storing part of encrypted characteristic information related to the authorized user of said card;

a personal encryption key field for storing the unique personal encryption key under which said characteristic information is encrypted.

4. An identity verification terminal for verifying the identity of person presenting an identification card of the type capable of receiving characteristic information related to a prospective terminal user and an identification card having machine readable and writeable information storage media, the improvement comprising:

means for reading a personal encryption key and a partial result from said card;

means for encrypting said characteristic information under said key to obtain a calculated result;

means for comparing said partial result with a first part of said calculated result;

means for indicating the result of the comparison of said partial result with said first part of said calculated result;

means responsive to said means for comparing, for transmitting a second part of said calculated result to a central location for comparison with a second partial result related to said identification card and stored at said central location;

means for receiving a response from said central location and indicating the result of said comparison with said second partial result.

5. The identity verification terminal of claim 4 further comprising:

means for generating a new personal encryption key;

means within said means for encrypting said characteristic information under said new personal encryption key to obtain a new calculated result;

means for writing a first part of said new calculated result and said new personal encryption key onto said identification card in place of said partial result and said personal encryption key;

means for transmitting a second part of said new calculated result to said central location for storage in place of said second partial result.

6. An identity verification system for verifying the identity of a prospective terminal user comprising:

a terminal having a keyboard for receiving characteristic characters related to a person presenting an identification card;

reading means at said terminal for reading a partial result and a personal encryption key from said identification card;

encrypting means at said terminal for encrypting said characteristic characters under said personal encryption key to obtain a calculated result;

means at said terminal for comparing said partial result with a first part of said calculated result; and indicating means for indicating the result of comparing said partial result; and transmitting means within said terminal for transmitting a second part of said calculated result to programmed computing means at a central location;

a program controlling said computing means at said central location to compare said second part of said calculated result received from said terminal with a second partial result related to said identification card and stored at said central location, said program responding to said terminal with an indication of the result of said comparison with said second partial result.

* * * * *